(12) United States Patent
Reime et al.

(10) Patent No.: US 8,643,827 B2
(45) Date of Patent: Feb. 4, 2014

(54) METHOD FOR MEASURING THE PROPAGATION TIME OF LIGHT

(75) Inventors: Gerd Reime, Buehl (DE); Peter Langer, Karlsruhe-Durlach (DE); Bernd Mayer, Ellwangen (DE)

(73) Assignee: Mechaless Systems GmbH, Bruchsal (DE)

( * ) Notice: Subject to any disclaimer, the term of this patent is extended or adjusted under 35 U.S.C. 154(b) by 894 days.

(21) Appl. No.: 12/162,120

(22) PCT Filed: Jan. 19, 2007

(86) PCT No.: PCT/EP2007/000454
§ 371 (c)(1),
(2), (4) Date: Oct. 17, 2008

(87) PCT Pub. No.: WO2007/085382
PCT Pub. Date: Aug. 2, 2007

(65) Prior Publication Data
US 2012/0176596 A1 Jul. 12, 2012

(30) Foreign Application Priority Data
Jan. 24, 2006 (DE) .......................... 10 2006 003 269

(51) Int. Cl.
*G01C 3/08* (2006.01)
(52) U.S. Cl.
USPC ........ 356/5.01; 356/3.01; 356/4.01; 356/5.09
(58) Field of Classification Search
USPC ................................. 356/4.01, 5.01
See application file for complete search history.

(56) References Cited

U.S. PATENT DOCUMENTS

| | | | | |
|---|---|---|---|---|
| 3,788,741 | A * | 1/1974 | Buechler | 356/4.06 |
| 5,285,784 | A * | 2/1994 | Seeker | 600/331 |
| 6,307,622 | B1 * | 10/2001 | Lewis | 356/4.01 |
| 6,373,559 | B1 | 4/2002 | Knupfer | |
| 7,218,402 | B1 * | 5/2007 | Brosnan et al. | 356/484 |

FOREIGN PATENT DOCUMENTS

| | | |
|---|---|---|
| DE | 19902612 | 7/2000 |
| DE | 10006493 | 8/2001 |
| DE | 10322552 | 12/2004 |
| DE | 10350489 | 6/2005 |
| JP | 2005-091214 A | 4/2005 |
| WO | WO-2004/061639 | 7/2004 |
| WO | WO-2004-061639 A | 7/2004 |

* cited by examiner

*Primary Examiner* — Isam Alsomiri
*Assistant Examiner* — Samantha K Abraham
(74) *Attorney, Agent, or Firm* — Rabin & Berdo, P.C.

(57) ABSTRACT

A method for measuring the transmit time of light, in particular for cameras. A first light signal is clocked by a first clock controller, input into a light system and reflected back to a receiver photodiode, which determines a reception signal as a result of the first light signal. A further light signal clocked by a further clock controller inputs the photodiode at an angle to the first light signal and is mixed at the photodiode with the first light signal to form a common reception signal, which is filtered with a filter whose frequency response corresponds to the frequency of the clock difference to form a filter signal, the first and further clock signals are also mixed in a mixer to form a mixed signal and the phase shift between the mixed signal and the filter signal is used to determine the transit time of light.

18 Claims, 4 Drawing Sheets

US 8,643,827 B2

METHOD FOR MEASURING THE PROPAGATION TIME OF LIGHT

REFERENCE TO RELATED APPLICATIONS

The present application claims the priority of German patent application 10 2006 003 269.1, filed on 24.01.2006, the disclosure content of which is also explicitly made into the subject-matter of the present application.

FIELD OF THE INVENTION

The invention relates to a method for measuring the propagation time of light, in particular for cameras according to the preamble of claim 1.

PRIOR ART

In many fields of application, the distance of a reference object to other objects has to be determined. One such field of application is most notably that of camera systems, for example also in the automotive industry or in the field of robotics.

In this respect, the following problem arises according to the prior art: if a pulsed voltage is applied to a light diode, said light diode is illuminated in the rhythm of this applied voltage. A reflecting object can reflect the radiated luminous power to a photodiode preferably in the vicinity of the transmitting LED. The magnitude of the reflected signal is dependent on the transmitting power of the LED, on the reflectance of the object and on the distance of the object from the transmitting LED. With a distance of a reflecting object, for example a hand, of, for example one meter, the use of a commercially available LED with, for example 100 mA pulsed current, an aperture angle of, for example 15° and a commercially available low cost photodiode, for example BPW 34 Osram, there results a photocurrent, produced by the reflection on the hand, of for example a few µA in the photodiode. This photocurrent naturally changes with the distance of the reflecting object, so that with distances of more than one meter, it may only amount to a few pA in the photodiode. In order to measure the distance of the reflecting object, a measurement of the propagation time between transmitted and received signal is a possibility, but it is very difficult with the very small receiving currents mentioned above in the photodiode to determine the exact time of arrival.

Another complicating factor is that the incoming signal in the photodiode or in the connected amplifiers does not produce the edge steepness with which it was transmitted. The photodiode acts as a lowpass, particularly when it is selected to be of a high magnitude (large receiving surface) to increase the sensitivity. The propagation time of light is approximately 1 ns with a distance of approximately 15 cm. The rise time of the received signal can certainly amount to 10 µs on account of the lowpass behavior of the aforementioned photodiode and pre-amplifiers. The transmitting LED also has a notable rise time, but is below the lowpass behavior of low cost photodiodes by orders of magnitude.

Thus, the detection of the exact arrival time of the reflection signal gives rise to considerable difficulties, and indeed many patent applications deal with improving the detection of the exact arrival time of the reflection signal.

It is generally known that it is easier to determine relatively great reflection distances, for example some 10 to 100 m, in this way. Furthermore, a measurement from approximately 3 m to 250 m is easier than a measurement in the near field of 0 to 3 m, as in this case the measurement has to be carried out with ns accuracy, which in turn requires photodiodes and amplifiers in the GHz range. Further complicating factors are extraneous light, temperature and the respective reflectance of the object to be measured. These parameters usually have a considerable influence on the distance measurement. However, in this respect, quite considerable transmitting powers (for example lasers, pulsed 10 W) are often used in practice.

It is known that the phase shift in a mixing procedure is maintained to obtain the IF frequency. If this method is chosen for the propagation time and distance measurement, intensity-modulated light with a modulation frequency in the 10 MHz range has to be received and mixed, which requires rapid photodiodes and pre-amplifiers. High amplification simultaneously with high frequency is possible only to a restricted extent. For this reason, it is sensible to mix as soon as possible in the receiving path. However, conventional mixers do not operate with the photocurrent.

Thus, German patent application DE 199 02 612 A1 discloses an optoelectronic mixer which consists of a photodiode with two separate electrodes to which an amplitude-modulated voltage is applied such that the photocurrent generated in the photodiode by a beam of light, is mixed with the amplitude-modulated voltage. It is shown in particular that this mixer can be used in a distance measuring device where a light transmitter transmits an amplitude-modulated light signal to an object to be measured, a light sensor detects the reflected light signal returning from the object and an evaluation unit determines the phase shift between the transmitted light signal and the returning light signal. In this respect, the electro-optical mixer allows the is conversion of a high amplitude modulation frequency into a lower frequency range at one point in the signal path where a broadband electrical amplification has still not taken place.

DE 100 06 493 A1 discloses a method and a device for optoelectronic distance measurement, two light emitters and two photodiode receivers being used for calibration. Some of the modulated power from the main emitter arrives on the object to be measured and passes from there in the form of scattered light on to the main photo receiver and another portion of the power from the main emitter arrives directly on a reference photo receiver, while some of the modulated power from the reference light emitter is guided directly on to the main photo receiver and another portion is guided directly on to the reference photo receiver.

Even if the time of the received signal had been precisely determined, a further undesirable effect occurs. Additional extraneous light in the photodiode slightly changes the amplitude and the rise time of the received signal, so that the distance measurement can also be influenced by extraneous light.

It is known from DE 103 22 552 A1 to direct the luminous radiation reflected at an object as well as the luminous radiation from a second light path which originates from a further transmitter or a compensation light source, parallel or at the same angle to the receiver. Namely, if light from a light source on the one hand is radiated from the front into the photodiode and coupled laterally from a further light source, the rise time greatly increases with lateral coupling with a pulsed current in the light signal. Thus, extraneous light has a substantially greater influence in the case of lateral coupling. The dimensionless point, arising with complete compensation, on the light intensity photocurrent characteristic again becomes a path, subject to extraneous light influences, on the characteristic of the photodiode. Thus, the same incidence angle for the received signal and the compensation signal is actually optimum.

DISCLOSURE OF THE INVENTION

Starting from this prior art, the present invention is based on the object of providing a method for measuring the propagation time of light which, particularly in the case of cameras can operate even with relatively inexpensive components and relatively low-frequency amplifiers.

This object is achieved by a method having the features of claim 1.

To mix the clocked signals and thus to measure the propagation time of light, the modulation of the sensitivity of a photodiode by extraneous light is used and this particularly during radiation from different angles. Strong ambient light changes the space-charge region of a photodiode, as a result of which the absorption range producing drift current is increased. This causes a change in sensitivity particularly, but not only, for infrared light. This modulation is independent of the connection resistances and the depletion layer capacitance, since the absorbed extraneous light photons cause a flooding of the semiconductor with charge carriers and are thus not governed by the electrical connection time constants which determine speed. The measurable photocurrent results as the mixed product. In this respect, the depletion layer capacitance together with the connection resistance is already effective as a lowpass. As an overall result, the differential mixed product thus mainly arrives at the subsequent amplifier.

This mixed product has a much lower frequency than the clock frequency and, if the clock difference between the two clock controls is known, can be detected very accurately. At the same time, the difference of the clock signals can also be determined which results without a light path, in that the two clock signals are also mixed. When the two mixed products are compared, there results a measurable phase shift at a relatively low frequency.

A distance measurement is made possible which allows an exact propagation time measurement of light, free from extraneous light problems independently of the reflectance with large-surface low cost photodiodes and amplifiers of a narrow band width. Moreover, a propagation time measurement is possible at close range from the sensor surface through to relatively great distances without switching over the measuring range. Since this modulation method can be applied to all photodiodes and, above all, to all silicon photodiodes, the invention is able to provide a large number of active optical sensors with 3D characteristics.

Further advantages are provided in the sub-claims and in the following description.

BRIEF DESCRIPTION OF THE FIGURES

The invention will be described in more detail in the following with reference to an embodiment illustrated in the figures, of which

DETAILED DESCRIPTION OF PREFERRED EMBODIMENTS

The invention will now be described by way of example with reference to the accompanying drawings. The embodiments are, however, only examples which are not intended to restrict the inventive concept to one specific arrangement.

Before the invention is described in detail, it should be noted that it is not restricted to respective components of the circuit or to the respective method steps, since these components and methods can vary. The terms which are used here are merely intended to describe particular embodiments and are not used in a restrictive manner. If, moreover, the singular or indefinite article is used in the description and claims, is then that which is stated also relates to the plural of these elements, provided that the general context clearly does not mean something different.

The modulation method, explained in the following, can be applied to all photodiodes and in particular to all silicon photodiodes, such that a large number of active optical sensors can thus be provided with 3D characteristics. The preferred purpose of use is for cameras 10, although the invention is described in the following with reference to only one pixel 24. Other possible areas of use include the automotive sector, for example park distance control or lane departure or generally optical distance measuring devices or optical radar.

Figure 2:
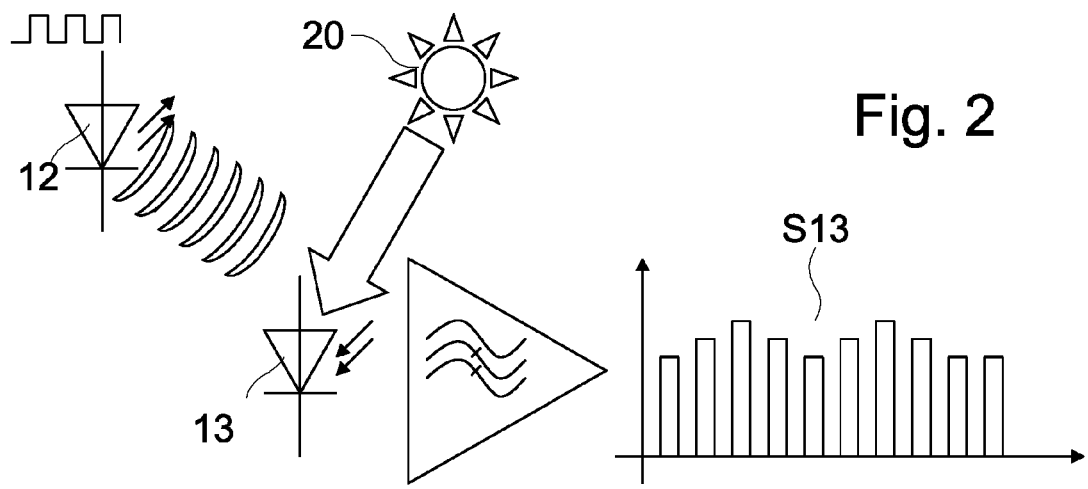
FIG. 2 is a schematic illustration of a received signal influenced by extraneous light.

The present invention is based on the following observation:

In principle, when photodiodes are used, the emitted light is reflected not only at the object O, but also at any surfaces which are in the reflection range. Consequently, a continuously clocked signal portion is provided in the receiver. The amplitude of this permanently present signal can also be influenced in the photodiode by extraneous light. Thus, according to FIG. 2, the sensitivity of a photodiode depends on the radiated total light intensity (ambient light effect). If, for example, the signal from the light transmitter 12, such as a light emitting diode is superimposed with extraneous light, such as the light from a strong light source 32, for example the sun, the amplitude of the received signal S13 depends on the strength of the sunlight. More or less all photodiodes exhibit this effect. If incident extraneous light is altered, for example in its intensity, the amplitude of the received signal is also altered. It is thus impossible to clearly distinguish whether the distance to the object is altered or whether only the extraneous light portion was influenced, for example by any random shadowing or reflection. The reason for these misinterpretations is that when a clocked signal is received by a photodiode, a region is constantly scanned in the characteristic of the photodiode. Depending on the steepness of the characteristic, the delta of the photocurrent varies in size, which in turn leads to a differing signal level. Thus, the extraneous light portion shifts the average of the photocurrent delta on the characteristic.

Figure 3A:
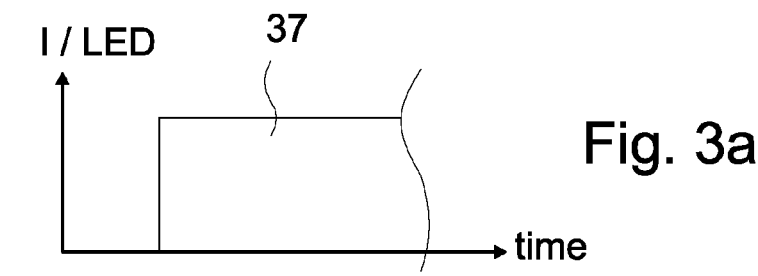
FIG. 3a shows a clocked transmission signal from an LED.
Figure 3B:
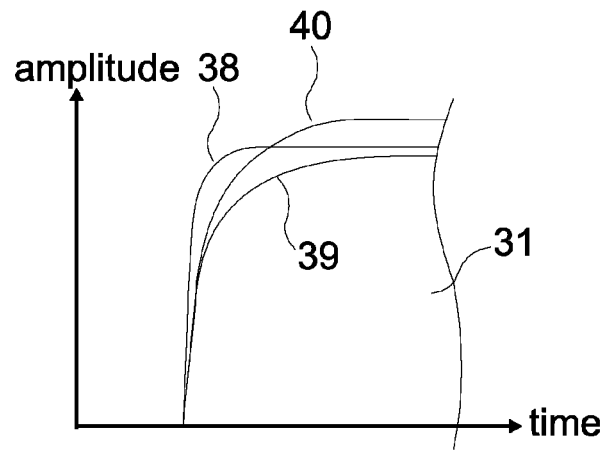
FIG. 3b shows different signal paths of the received signal depending on the angle of incidence.

However, the problem arises particularly where corresponding accuracy requirements are imposed on the measurements to be carried out that compensations are not completely possible, in particular when light does not fall directly from the front into the photodiode 13. This is described with reference to FIGS. 3a and 3b. When a signal 31 is coupled by a light source according to arrow 34 in FIG. 4 directly from the front into the photodiode 13, the shortest rise time is achieved with a pulse jump 37 (FIG. 3a). Said shortest rise time is also usually stated in the data sheets in respect of the corresponding photodiode. What is less known is that where there is lateral coupling of a signal by a light source along arrow 35 in FIG. 4, the rise time 39 already drastically increases with an incidence angle of 45°. In addition, in the case of lateral coupling, extraneous light from a light source 6 has a substantially greater influence on the measured amplitude and the rise time 40.

Figure 4:
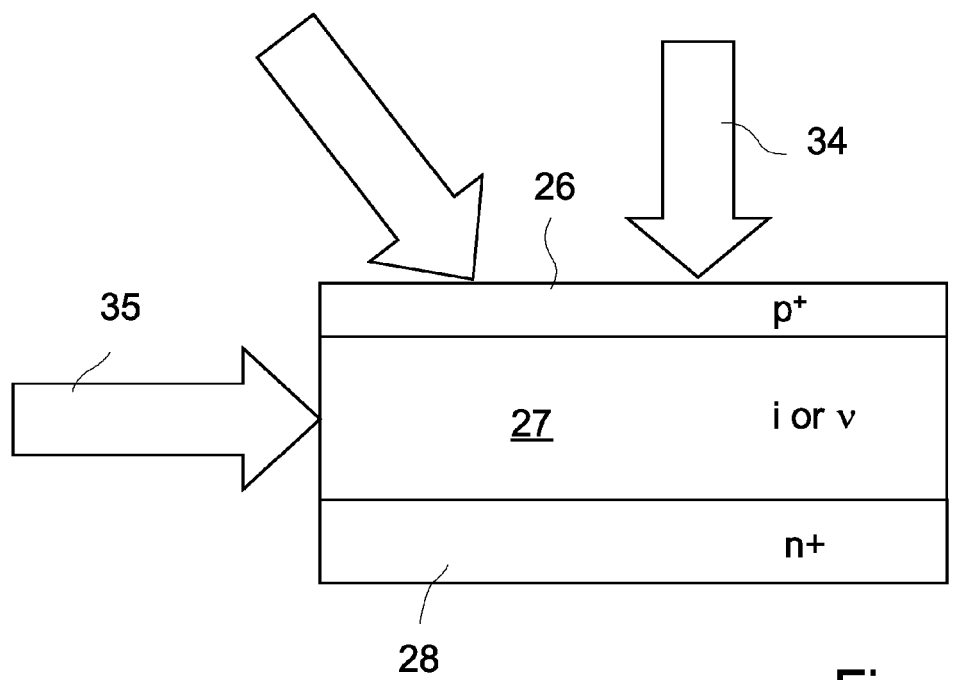
FIG. 4 is a side view of a photodiode.
Figure 5:
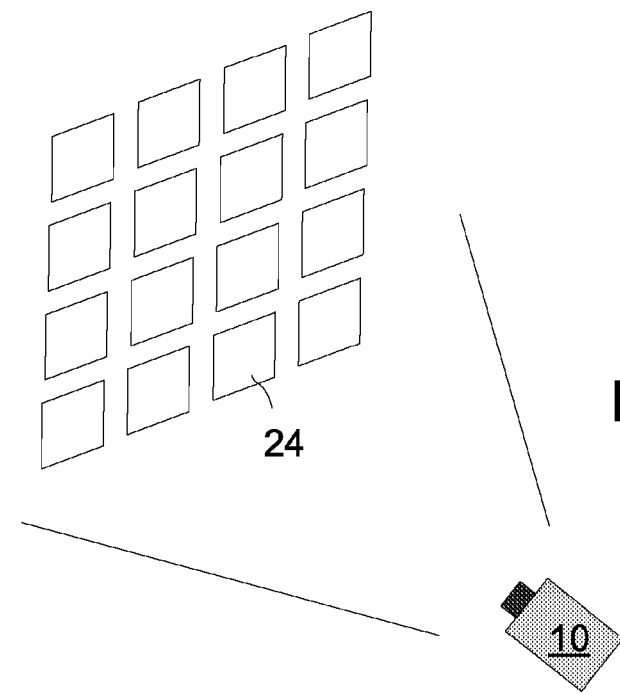
FIG. 5 shows an associated camera system.
Figure 6:
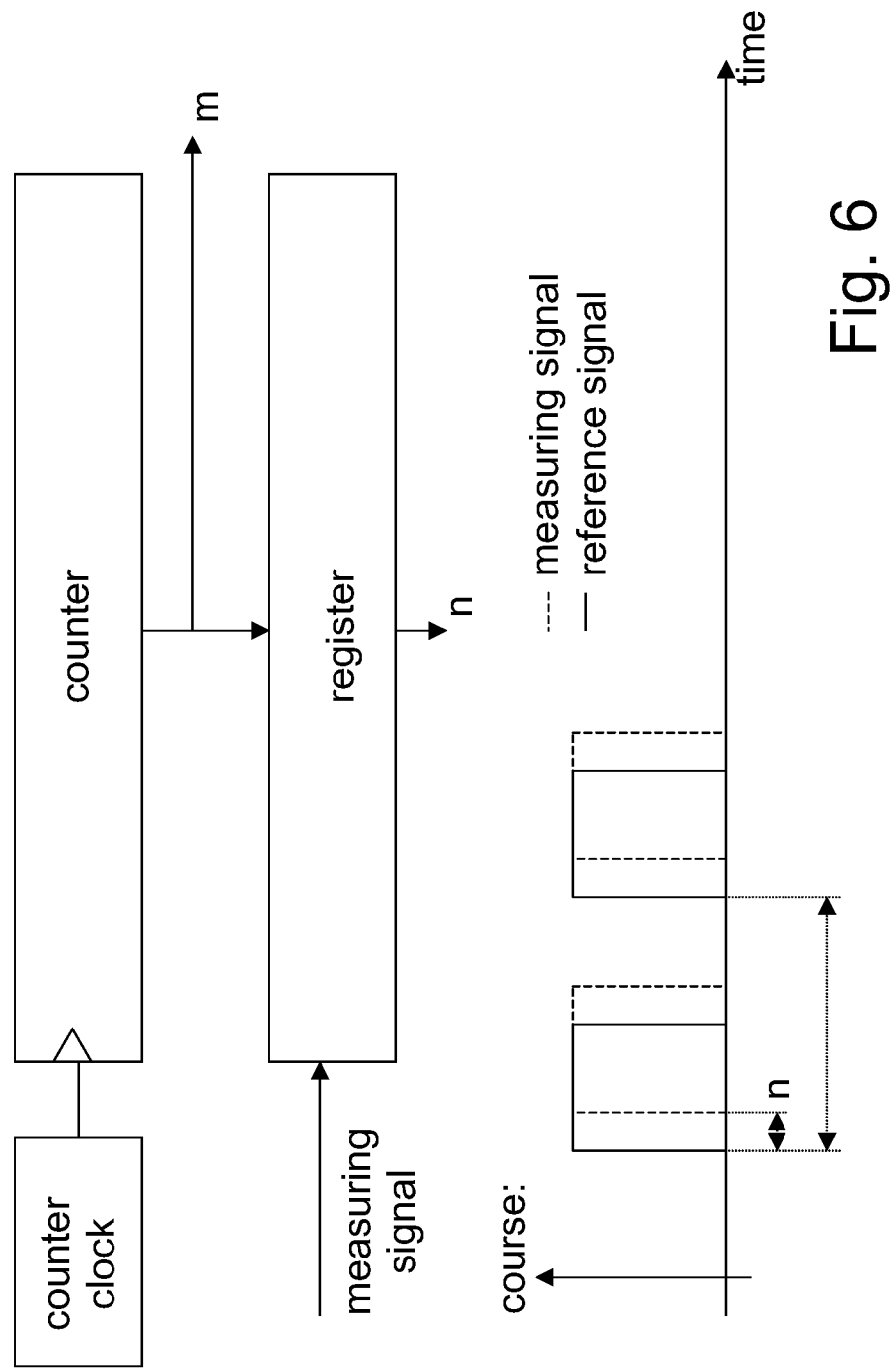
FIG. 6 is a schematic illustration of a device for determining the phase shift.

This can be explained in physical terms as follows according to FIG. 4:

Light which is incident in the semiconductor material of the photodiode produces pairs of charge carriers. These charge carrier pairs are separated by an outwardly applied electric field and are supplied to the connections. A PiN structure is typically used for this purpose. The substrate material 28 is n-doped and conductively connected on the back with the leadframe. A thin layer of virtually undoped (intrinsic) silicon is located on the substrate material and is covered by a very thin heavily p-doped layer, which forms the anode of the photodiode. When a current is then applied to the reverse polarized photodiode, a strong electric field is produced in the intrinsic zone. Light which is incident vertically on the photodiode penetrates the p-zone 26 and generates pairs of charge carriers in the i-zone 27. These charge carrier pairs are separated by the applied electric field and they generate the measurable photocurrent. This is therefore a drift current. Due to their acceleration, the charge carriers rapidly arrive at the connections. Usually with the saturation speed for electrons or holes in silicon.

On the other hand, light which is incident laterally on the photodiode, produces charge carriers in the substrate or in the intrinsic zone 27, however outside or in the peripheral region of the electric field. The charge carriers produced thus slowly diffuse with a low efficiency to the electric field and are there supplied to the measurable photocurrent. Due to the relatively great time constant of the charge carrier diffusion, there thus results a substantially greater time constant of the step response. In the case of typical photodiodes, there results for laterally incident light a time constant which is greater by approximately factor 20 and which greatly distorts the received signal or shifts it in the phase position.

This effect is all the more pronounced the more ineffectually the edge of the photodiode is protected. Photodiodes which have a strong doping on the edge (for example a guard ring) are hardly affected by this. However, an angle dependence of the rise time is to be observed with practically all photodiodes, since light, depending on the incidence angle, penetrates to a varying depth into the i-zone, even if the beam of light is completely incident thought the p-zone. Particularly in the case of obliquely incident light, some of the charge carrier pairs are already generated in the p-zone. These charge carriers slowly diffuse towards the i-zone, as a result of which the measurable rise time is also prolonged.

Thus, a large number of individual procedures is responsible for the speed of a photodiode. Only for almost vertically incident light is the electric time constant of the photodiode (product of resistance in the receiving circuit and depletion layer capacitance) dominant. As soon as the diffusion photocurrent provides a substantial contribution to the photocurrent, this time constant is no longer dominant and the photodiode becomes more slowly measurable.

The modulation of the sensitivity of a photodiode by extraneous light and this in particular during radiation from different angles is used for mixing the clocked signals and thus for measuring the propagation time of light. Strong ambient light alters the space-charge region of a photodiode, as a result of which the absorption range generating drift current is increased. This causes in particular, but not only, for infrared light a change in the sensitivity. This modulation is independent of the connection resistances and the depletion layer capacitance, since the absorbed extraneous light photons cause a flooding of the semiconductor with charge carriers and are thus not governed by the electric connection time constants which determine the speed. The measurable photocurrent is produced as the mixed product. In this respect, the depletion layer capacitance together with the connection resistance is already effective is as a lowpass. As an overall result, the differential mixed product thus mainly arrives at the subsequent amplifier.

Figure 1:
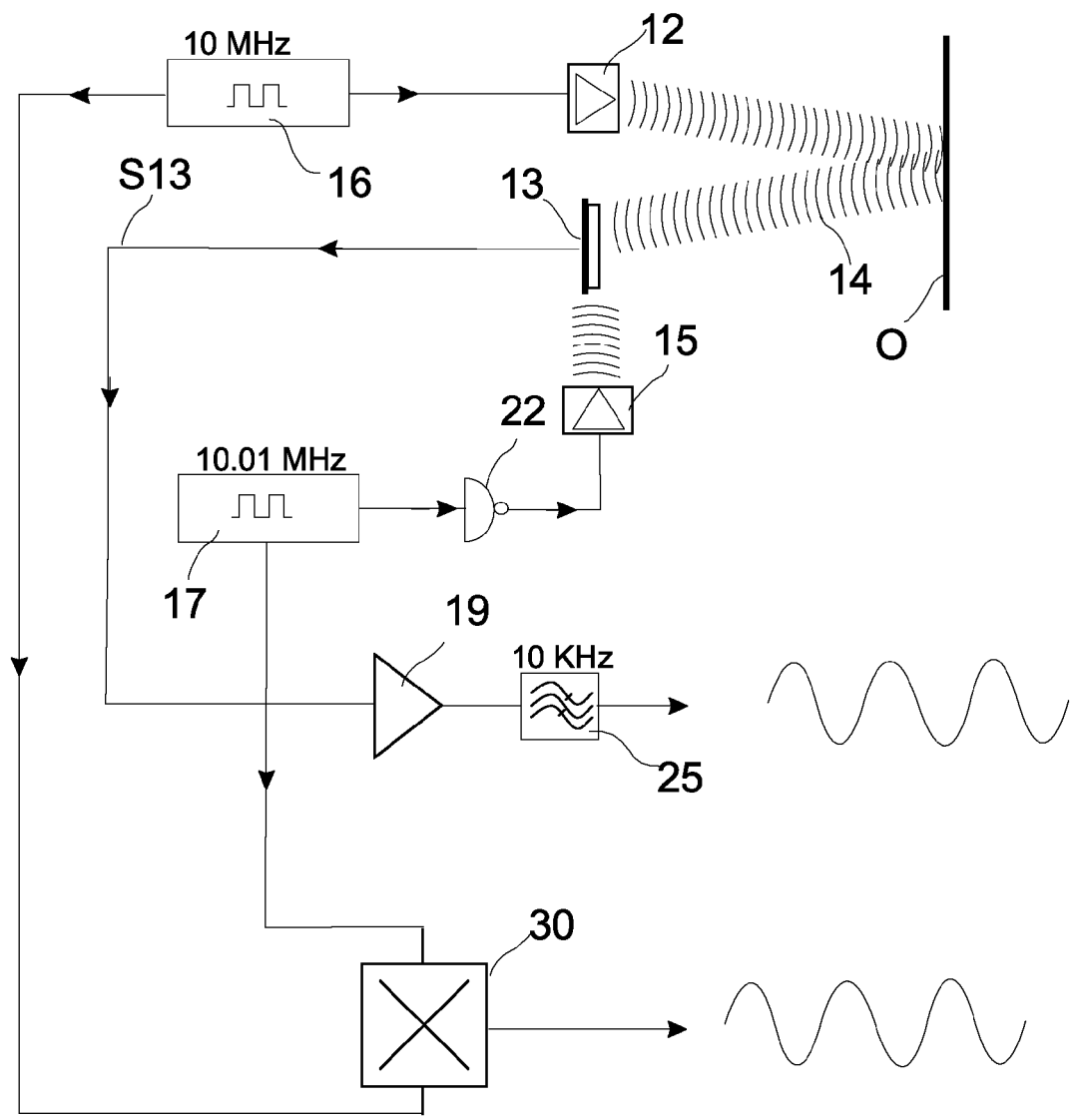
FIG. 1 is a schematic circuit diagram of a circuit according to the invention for measuring the propagation time of light.

This effect is used according to the invention for measuring the propagation time of light. According to FIG. 1, a first light signal, clocked by a first clock control 16 in the example with 10 MHz, from at least one light transmitter 12 is emitted into a light path 14 and reflected onto a photodiode 13 by means of a reflecting object O. The receiver photodiode 13 receives this light signal from the front, preferably frontally. In parallel, a further light signal clocked by a further clock control 17 is radiated at an angle to the first light signal, preferably laterally into the photodiode 13 and mixed therein with the first light signal to produce a common received signal S13. The clock frequency of the further clock control in the example is 10.01 MHz and thus has a clock difference to the first clock pulse of 10 KHz, but can also have another difference to the first clock pulse. The clock difference between the clock pulse of the first clock control 16 and of the second clock control 17 is preferably smaller by at least two orders of magnitude than the clock pulse thereof. The received signals are mixed in the photodiode, so that the common received signal S13 can be filtered to produce a filter signal using a filter 25, the frequency response of which corresponds to the frequency of the clock difference.

The clock signals themselves of the first clock control 16 and of the further clock control 17 are, however, also mixed directly in a mixer 30 to produce a mixed signal and then compared with the filtered received signal of the photodiode 13. The phase shift between the mixed signal of the clock controls 16, 17 and the filter signal can thus be used at a frequency to determine the light propagation time which is significantly less than the frequency of the clock controls, such that an increased accuracy of the propagation time measurement and thus distance measurement is possible.

For a camera 10, this can also take place simultaneously to image recognition, so that for each pixel the relevant distance is quickly provided. This enhances the quality of the image recognition.

The angle between the irradiation angle of the first light signal and of the further light signal is usually more than 45°, preferably more than 70°, but more preferably approximately 90°.

In principle, the received signal amplitude of the received signal S13 depends on the distance of the object, the size of the object and the reflectance of the object. The phase of the received signal depends on the propagation path. There is thus produced, due to the mixing in the photodiode 13 and in the mixer 30, a phase shift which can be easily used to determine the propagation time of light.

Moreover, it has been found that the result can also be positively influenced by the wavelength of the light. If the light transmitters 12 and further light transmitters 15 transmit in the infrared wavelength range, a good result is already produced. This result can be further improved if one of the two light transmitters 12 or further light transmitters 15 transmits with a wavelength in the infrared range and the other transmits with a wavelength in the red range or even better with a wavelength in the blue range.

Propagation time t for light via object O at a distance d to photodiode $t = 2*d/c_0$ This signifies for the intensity modulation with $f_0$ a phase shift of f:

$$\phi = tf_0 360°$$

This phase shift is transformed into the IF range and can there be determined as:

$$\varphi = \frac{n}{m} 360°$$

where: n=phase shift
m=clock spacing

The spacing d is determined from the measured values m and n as:

$$d = \frac{c_0 * n}{2 * m * f_0}$$

It is understood that this description can be subjected to the most varied modifications, changes and adaptations which are within the range of equivalents to the appended claims.

LIST OF REFERENCE NUMERALS 10 camera
12 light transmitter
13 photodiode
S13 received signal
14 light path
15 further light transmitter
16 clock generator for 12
17 clock generator for 15
19 amplifier
22 inverter
24 pixel
25 filter
26 p-zone
27 i-zone
28 substrate
30 mixer
31 signal
32 strong light source
34 arrow at 0° incidence angle (frontal)
35 arrow at 90° incidence angle (lateral)
37 electric pulse jump to the light source
38 step response at 0° incidence angle
39 step response at 45° incidence angle
40 step response at 90° incidence angle

The invention claimed is:

1. Method for measuring light propagation time comprising the steps of:
    transmitting a first light signal, clocked by a first clock control with a first clock and a first clock signal, from at least one light transmitter into a light path by means of a reflecting object on to a photodiode,
    determining a received signal as a result of the first light signal at the photodiode,
    radiating a further light signal, clocked by a further clock control with a further clock and a further clock signal, from a further light transmitter directly to the photodiode at an angle to the first light signal and mixing said further light signal transmitted directly to the photodiode with the first light signal within the photodiode to produce a common received signal,
    filtering the common received signal using a filter, the frequency response of which corresponds to a frequency of a clock difference between the first clock and the further clock, to produce a filter signal,
    using the common received signal from the light path to determine a propagation time,
    mixing the first clock signal of the first clock control and the further clock signal of the further clock control to produce a mixed signal in a mixer, and
    using the phase shift between the mixed signal and the filter signal to determine the propagation time of light.

2. Method according to claim 1, wherein the first light signal is radiated substantially frontally and the further light signal is radiated substantially laterally, into the photodiode.

3. Method according to claim 2, wherein the angle between the radiation angle of the first light signal and of the further light signal is more than 45°.

4. Method according to claim 3, wherein the angle between the radiation angle of the first light signal and of the further light signal is more than 70°.

5. Method according to claim 4, wherein the angle between the radiation angle of the first light signal and of the further light signal is approximately 90°.

6. Method according to claim 1, wherein the wavelength of the light emitted by the light transmitter and the light emitted by the further light transmitter is within the infrared range.

7. Method according to claim 1, wherein the wavelengths of the light emitted by the light transmitter and by the further light transmitter are different.

8. Method according to claim 7, wherein one of the first light transmitter and the further light transmitter emits light with a wavelength in the infrared range and the other emits light with a wavelength in the red range.

9. Method according to claim 7, wherein one of the first light transmitter and the further light transmitter emits light with a wavelength in the infrared range and the other emits light with a wavelength in the blue range.

10. Method for measuring light propagation time comprising the steps of:
    transmitting a first light signal, clocked by a first clock control with a first clock and a first clock signal, from at least one light transmitter into a light path by means of a reflecting object on to a photodiode,
    determining a received signal as a result of the first light signal at the photodiode,
    radiating a further light signal, clocked by a further clock control with a further clock and a further clock signal, from a further light transmitter at an angle to the first light signal into the photodiode and mixing said with the first light signal within the photodiode to produce a common received signal,
    filtering the common received signal using a filter, the frequency response of which corresponds to a frequency of a clock difference between the first clock and the further clock, to produce a filter signal,
    using the common received signal from the light path to determine a propagation time,
    mixing the first clock signal of the first clock control and the further clock signal of the further clock control to produce a mixed signal in a mixer, and
    using the phase shift between the mixed signal and the filter signal to determine the propagation time of light,
    wherein the frequency of the clock difference is smaller by at least two orders of magnitude than the frequencies of the first clock and the further clock.

11. Method according to claim 10, wherein the wavelength of the light emitted by the light transmitter and the light emitted by the further light transmitter is within the infrared range.

12. Method according to claim 10, wherein the wavelengths of the light emitted by the light transmitter and by the further light transmitter are different.

13. Method according to claim 12, wherein one of the first light transmitter and the further light transmitter emits light with a wavelength in the infrared range and the other emits light with a wavelength in the red range.

14. Method according to claim 12, wherein one of the first light transmitter and the further light transmitter emits light with a wavelength in the infrared range and the other emits light with a wavelength in the blue range.

15. Method according to claim 10, wherein the first light signal is radiated substantially frontally and the further light signal is radiated substantially laterally, into the photodiode.

16. Method according to claim 15, wherein the angle between the radiation angle of the first light signal and of the further light signal is more than 45°.

17. Method according to claim 15, wherein the angle between the radiation angle of the first light signal and of the further light signal is more than 70°.

18. Method according to claim 17, wherein the angle between the radiation angle of the first light signal and of the further light signal is approximately 90°.

* * * * *